US008331430B2

(12) United States Patent
Wang et al.

(10) Patent No.: US 8,331,430 B2
(45) Date of Patent: Dec. 11, 2012

(54) CHANNEL DIAGNOSTIC SYSTEMS AND METHODS

(75) Inventors: Peiqing Wang, Irvine, CA (US); Minshine Shih, Irvine, CA (US); Bruce H. Conway, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 1402 days.

(21) Appl. No.: 11/461,966

(22) Filed: Aug. 2, 2006

(65) Prior Publication Data

US 2008/0031142 A1    Feb. 7, 2008

(51) Int. Cl.
*H04B 17/00* (2006.01)

(52) U.S. Cl. ........ 375/224; 375/219; 375/220; 375/222; 375/257; 375/260; 375/295; 375/316; 375/346; 455/9; 455/14; 455/24; 455/39; 455/63.1; 455/67.13; 455/73; 455/91; 370/201; 370/216; 370/241; 370/242; 370/247; 370/250; 370/251; 370/252; 370/272; 370/273; 370/276; 370/297; 370/336; 370/337; 370/343; 370/344; 370/347; 370/442; 370/464; 379/1.01; 379/1.04; 379/2; 379/22.03; 379/22.08; 379/26.01; 379/27.01; 379/93.01; 379/406.01; 379/414; 379/416; 379/417; 714/2; 714/100; 714/799

(58) Field of Classification Search ............. 370/241, 370/242, 244, 245, 250, 252, 201, 216, 247, 370/251, 272, 273, 276, 297, 336, 337, 343, 370/344, 347, 442, 464; 375/229, 232, 219, 375/220, 222, 224, 257, 260, 295, 316, 346; 455/9, 14, 24, 39, 63.1, 67.13, 73, 91; 379/1.01, 379/1.04, 2, 22.03, 22.08, 26.01, 27.01, 379/93.01, 406.01, 414, 416, 417; 714/2, 714/100, 799

See application file for complete search history.

(56) References Cited

U.S. PATENT DOCUMENTS

| 3,962,637 | A |   | 6/1976  | Motley et al. |         |
|-----------|---|---|---------|---------------|---------|
| 4,539,675 | A |   | 9/1985  | Fisher        |         |
| 4,547,633 | A | * | 10/1985 | Szechenyi     | 370/242 |
| 4,859,951 | A | * | 8/1989  | Cole et al.   | 324/534 |

(Continued)

FOREIGN PATENT DOCUMENTS

EP    0 268 391 A1    5/1988

(Continued)

OTHER PUBLICATIONS

European Search Report for European Patent Application No. 03016209.3 dated Sep. 27, 2005, 3 pages.

(Continued)

*Primary Examiner* — Leon Flores
(74) *Attorney, Agent, or Firm* — Sterne, Kessler, Goldstein & Fox P.L.L.C.

(57) ABSTRACT

A system includes at least one adaptive filter coupled to a first communication channel and at least one other communications channel. The at least one adaptive filter includes at least one set of adaptive filter coefficients. A memory stores at least one predetermined set of filter coefficient thresholds. The filter coefficient thresholds may be indicative of channel faults, channel to channel faults or a length of the channel. A controller is configured to compare the set of filter coefficients to the predetermined set of filter coefficient thresholds. The controller is configured to determine the information about the channels based on compare results.

31 Claims, 11 Drawing Sheets

U.S. PATENT DOCUMENTS

| | | | |
|---|---|---|---|
| 5,099,436 A | 3/1992 | McCown et al. | |
| 5,155,742 A | 10/1992 | Ariyavisitakul et al. | |
| 5,210,774 A | 5/1993 | Abbiate et al. | |
| 5,351,247 A | 9/1994 | Dow et al. | |
| 5,448,369 A | 9/1995 | Lee et al. | |
| 5,481,195 A | 1/1996 | Meyer | |
| 5,481,564 A | 1/1996 | Kakuishi et al. | |
| 5,661,668 A | 8/1997 | Yemini et al. | |
| 5,872,815 A | 2/1999 | Strolle et al. | |
| 5,887,032 A * | 3/1999 | Cioffi | 375/257 |
| 6,055,119 A | 4/2000 | Lee | |
| 6,160,673 A | 12/2000 | Izumi et al. | |
| 6,385,561 B1 | 5/2002 | Soraghan et al. | |
| 6,590,930 B1 | 7/2003 | Greiss | |
| 6,661,761 B2 | 12/2003 | Hayami et al. | |
| 6,697,768 B2 | 2/2004 | Jones et al. | |
| 6,700,977 B2 * | 3/2004 | Sugiyama | 379/406.08 |
| 6,744,854 B2 | 6/2004 | Berrier et al. | |
| 6,833,875 B1 | 12/2004 | Yang et al. | |
| 6,856,655 B1 | 2/2005 | Garcia | |
| 6,901,243 B2 | 5/2005 | Jayaraman et al. | |
| 6,934,655 B2 | 8/2005 | Jones et al. | |
| 6,985,521 B1 | 1/2006 | Rezvani et al. | |
| 7,254,217 B2 * | 8/2007 | Rude et al. | 379/3 |
| 7,480,367 B2 * | 1/2009 | Rude | 379/3 |
| 2002/0169585 A1 * | 11/2002 | Jones et al. | 702/189 |
| 2003/0018981 A1 | 1/2003 | Ramsey | |
| 2003/0210752 A1 | 11/2003 | Krupka | |
| 2004/0013178 A1 * | 1/2004 | Bui et al. | 375/219 |
| 2004/0013208 A1 * | 1/2004 | Bui et al. | 375/316 |
| 2004/0022195 A1 | 2/2004 | Chen | |
| 2004/0193411 A1 * | 9/2004 | Hui et al. | 704/233 |
| 2005/0012508 A1 * | 1/2005 | Pandya et al. | 324/628 |
| 2006/0007991 A1 | 1/2006 | Wang | |
| 2006/0007992 A1 | 1/2006 | Wang | |
| 2006/0007993 A1 | 1/2006 | Wang | |
| 2006/0067239 A1 | 3/2006 | Olinski | |
| 2007/0274379 A1 * | 11/2007 | Valliappan et al. | 375/232 |
| 2007/0280388 A1 * | 12/2007 | Torre et al. | 375/350 |

FOREIGN PATENT DOCUMENTS

| | | |
|---|---|---|
| EP | 1420521 A2 * | 5/2004 |
| WO | WO 01/30013 A3 | 4/2001 |

OTHER PUBLICATIONS

Maier, F.A. and Seeger, H., "Automation of optical time-domain reflectometry measurements." *Hewlett-Packard Journal*, v46, n1, p. 57(6), 4-Page Reprint, (Feb. 1995).

Navaneethan, S. et al., "Automatic Fault Location for Underground Low Voltage Distribution Networks," *IEEE Transactions on Power Delivery*, vol. 16, No. 2, pp. 346-351 (Apr. 2001).

Bellanger, M.G., "Adaptive Digital Filters and Signal Analysis," 1987, pp. 313-314.

* cited by examiner

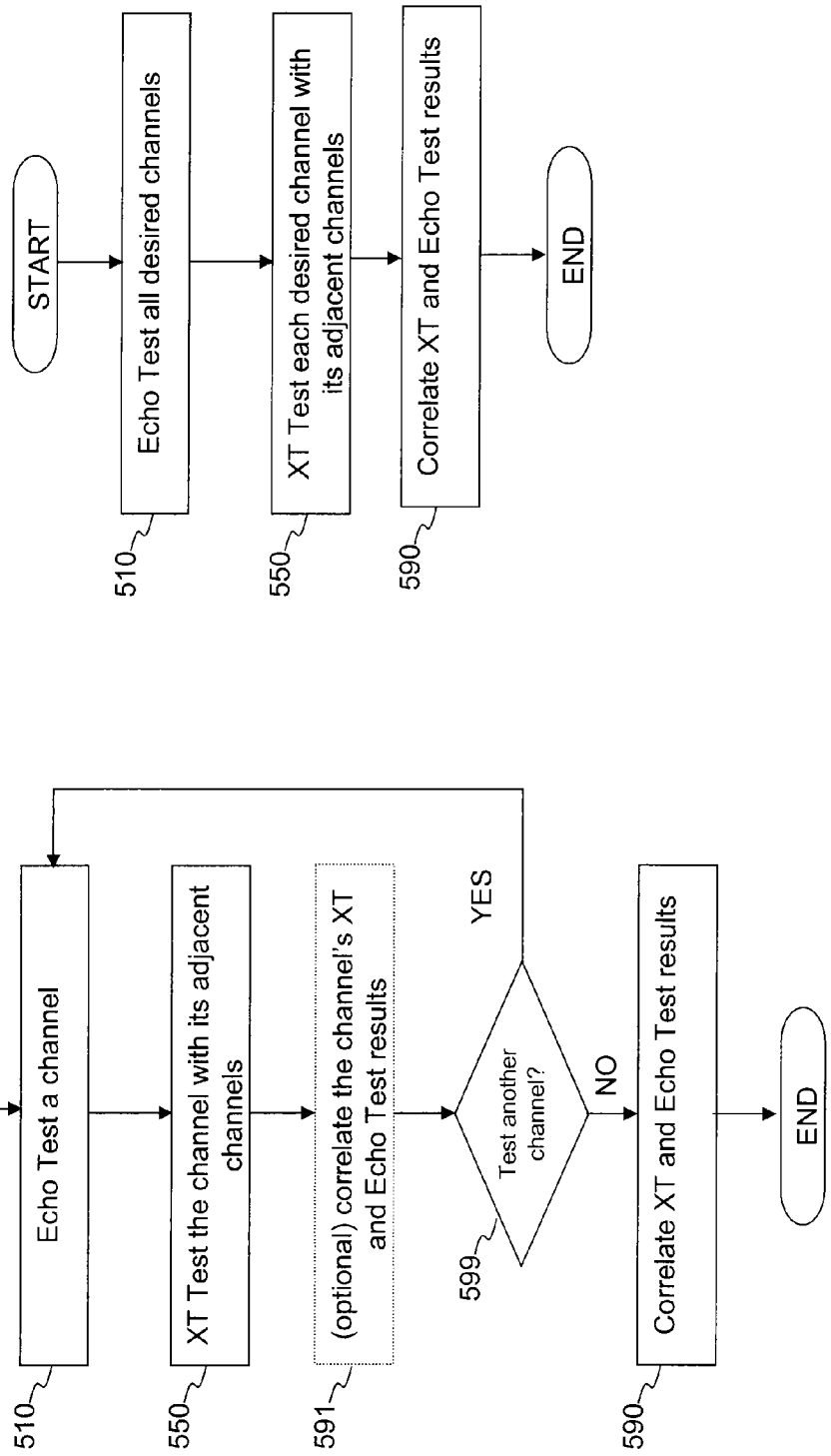

CHANNEL DIAGNOSTIC SYSTEMS AND METHODS

CROSS-REFERENCE TO RELATED APPLICATIONS

This application is related to the subject matter disclosed in U.S. patent application Ser. No. 10/282,206, filed Oct. 29, 2002, Publication No. 20040013178, entitled "CHANNEL DIAGNOSTIC SYSTEMS AND METHODS," and commonly owned with the present invention. The disclosure of the '206 application is incorporated herein by reference in its entirety.

BACKGROUND

1. Field of Invention

The present invention relates generally to communication devices and related methods, and more particularly, to such a device using an adaptive filter.

2. Related Art

A known communication system includes a pair of transceivers that communicate with each other over a communication channel, such as a wire or optical cable. On occasion, a fault in the communication channels inhibits communication between the transceivers. It is desirable to be able to determine whether such a fault exists. If such a channel fault exists, it may be difficult to determine useful information about the fault upon basic inspection, such as its location in the channel. Thus, it is also desirable to be able to determine information about the fault, such as its location in the channel. It is also desirable to be able to determine other information about the communication channel, such as the length of the channel in the absence of a fault. It is also desirable to be able to determine the above-mentioned information about the channel without having to examine the channel physically.

BRIEF SUMMARY OF THE INVENTION

Embodiments of the present invention include systems and related methods for determining information about a communication channel and at least one other communication channel. The system includes at least one adaptive filter coupled to the first communication channel. The at least one adaptive filter includes a set of adaptive filter coefficients. A memory stores at least one predetermined set of filter coefficient thresholds for comparison against the filter coefficients. The filter coefficient thresholds may be indicative of channel faults, channel to channel faults or a length of the channel, for example. A controller is configured to compare the set of filter coefficients to the predetermined set of filter coefficient thresholds. The controller is configured to determine the information about the channels based on compare results from the compare step. The information about the channels includes (i) whether there is a channel to channel fault, such as a short between the channels, and (ii) whether there is a channel fault, such as an open or short circuit condition in the channel, and (iii) if there is a fault, a distance between the adaptive filter and the fault.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention. In the drawings, like reference numbers indicate identical or functionally similar elements.

FIGS. 5A-5B are flowcharts of example methods of determining information about plurality of channels based on filter coefficients and corresponding filter coefficient thresholds.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1A:
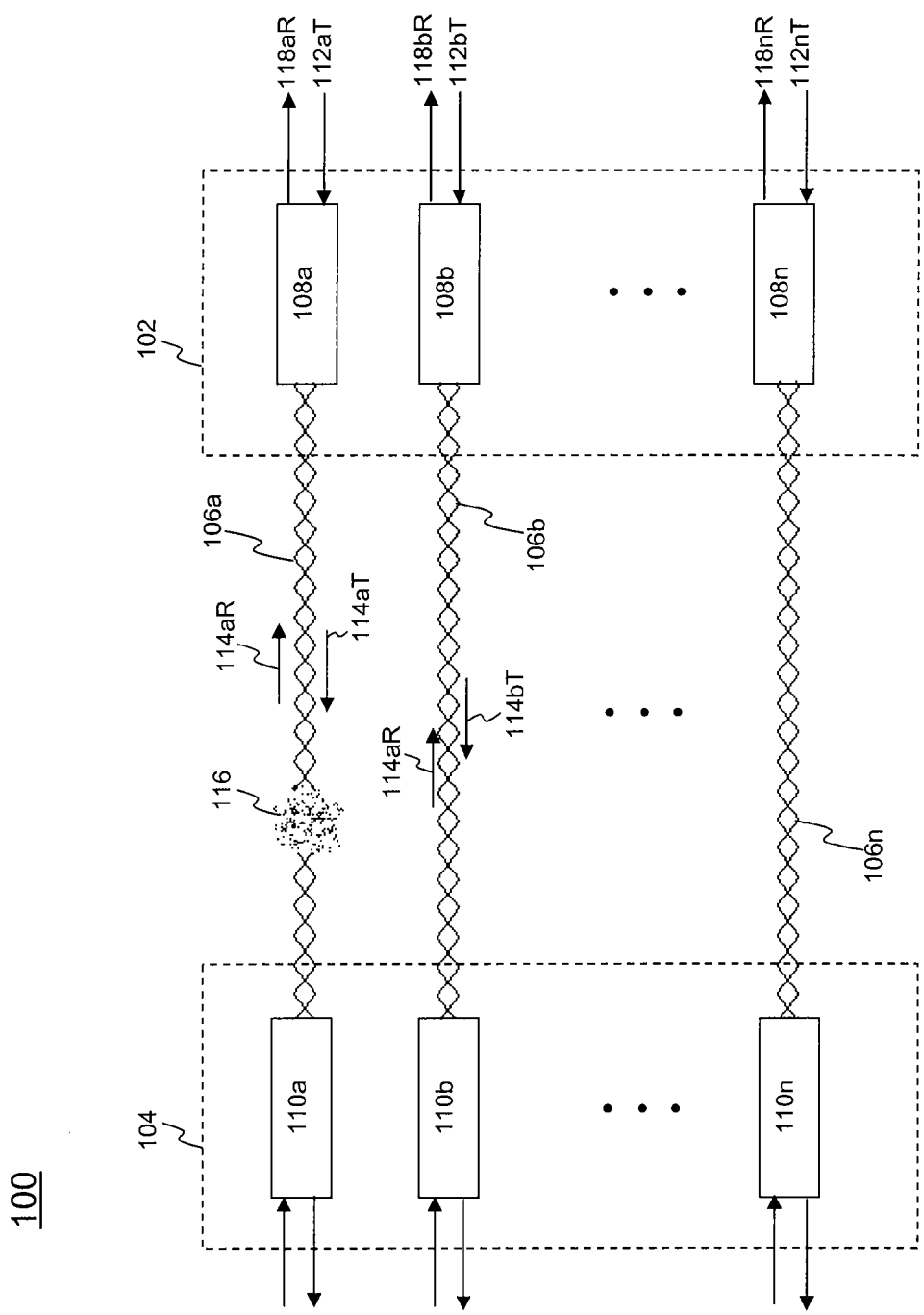
FIG. 1A-1B are block diagrams of an example communication system in which the present invention can operate.
Figure 1B:
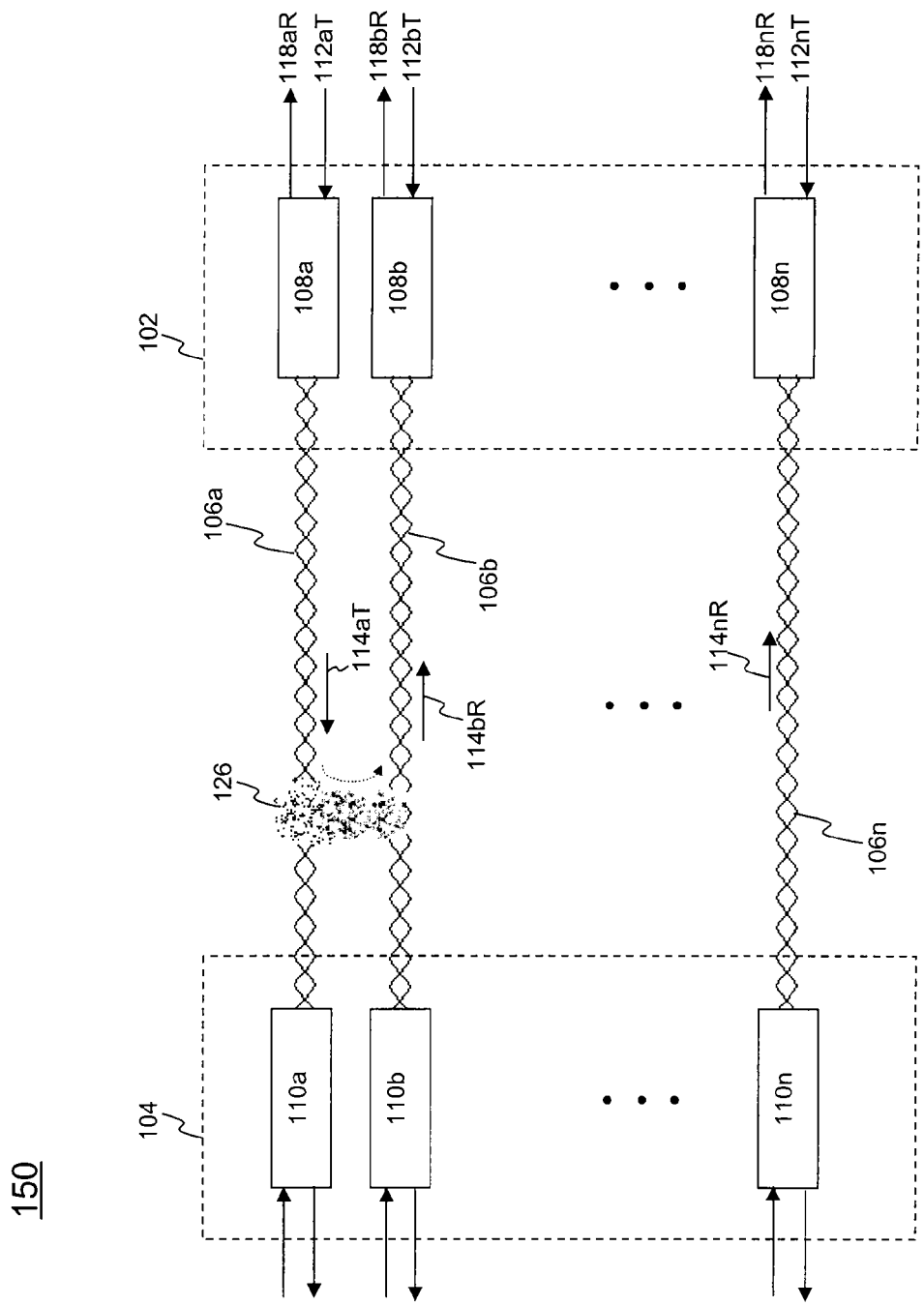

FIGS. 1A-1B represent an example communication system 100 in which the present invention can operate. System or environment 100 includes a transmitter/receiver (transceiver) assembly 102 and a transceiver assembly 104, that communicate with each other over communication channels 106a-106n. Transceiver assembly 102 includes transceivers 108a-108n, coupled respectively to communication channels 106a-106n. Transceiver assembly 104 includes transceivers 110a-110n respectively coupled to communication channels 106a-106n. Communication channels 106 may include wire and/or optical cables. The terms "channel" and "cable" are used equivalently and interchangeably herein.

Normal Operation

In normal operation, transceiver 108a receives an input symbol stream 112aT from an external data source, not shown. Transceiver 108a generates a transmit symbol stream or signal 114aT from input symbol stream 112aT, and transmits the symbol stream to corresponding transceiver 110a over communication channel 106a. Transceivers 108a and 110a are said to be communication "link partners," because they establish a communication link between, and then communicate with, each other over communication channel 106a.

Transceiver 108a receives a receive signal 114aR from communication channel 106a, and derives a corrected, adaptively filtered output stream 118aR from receive signal 114aR. Receive signal 114aR may include a transmit signal originated from transceiver 110a. Additionally and/or alternatively, receive signal 114aR represents energy from transmit signal 114aT that has been reflected back toward transceiver 108a. Transmit signal 114aT may be reflected from a channel fault 116 in channel 106a (such as a break in the channel) and/or from an impedance mismatch at a coupling section between channel 106a and transceiver assembly 104. Such reflected energy represents an "echo."

"Cross talk" from an adjacent channel 106b may result in received signal 114aR including a component representing energy from an adjacent transmit signal 114bT. A channel to channel fault 126 between channels 106a and 106b may cause detectable or an increase in detectable cross talk in received signal 114aR from transmit signal 114bT.

Figure 2:
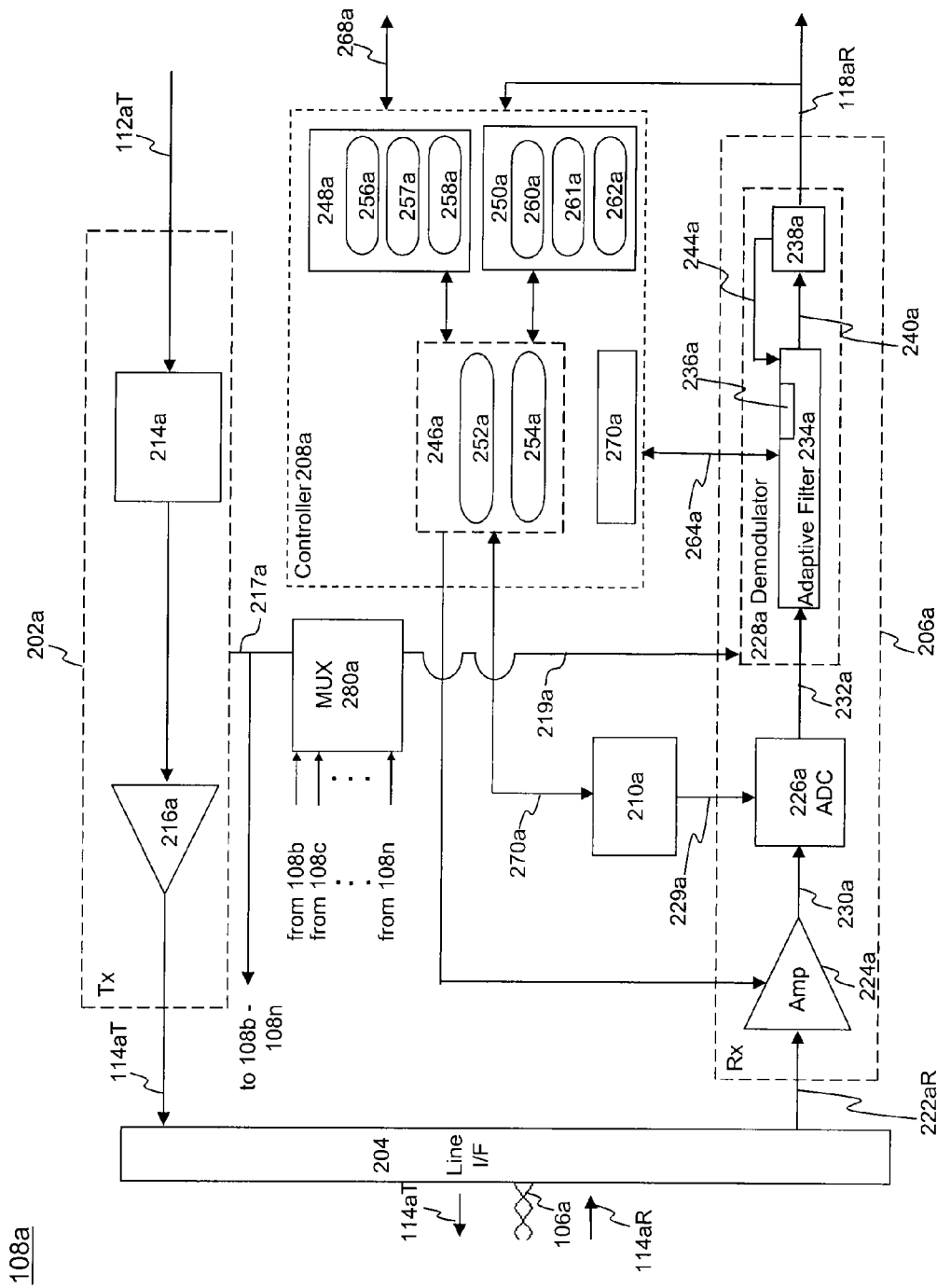
FIG. 2 is a block diagram of an example system, constructed and operated in accordance with the principles of the present invention, which expands on a transceiver of FIG. 1.

FIG. 2 is a block diagram of an example arrangement of a transceiver 108a. Transceiver 108a is one of a series of transceivers 108a to 108n. Transceiver 108a includes a transmit path 202a, a line interface 204a, a receive path 206a, a controller module 208a, and a receive sample clock generator 210a. Transceivers 108a-108n may share a single controller 208, or may each have their own controller 208a-208n. In example embodiments described herein, the controller and controller elements associated with, for example, transceiver 108a are referred to as, for example, 208a. It should be understood that controller 208a and controller 208b may in fact be the same physical controller. Transmit path 202a includes a modulator 214a and a transmit amplifier 216a. Together, modulator 214a and transmit amplifier 216a generate transmit symbol stream or signal 114aT from input symbol stream 112aT. Line interface 204 couples transmit signal 114aT to communication channel 106a. Also, transmit path 202a provides a transmit replica signal 217a representative of transmit symbol stream 114aT to receive path 206a. Signal 217a may be a digital signal or an analog signal representation of transmit signal 114aT.

Transmit replica signal 217a is multiplexed with transmit replica signals 217b-217n from transceivers 108b-108n. Multiplexer (MUX) 280a selects one of the transmit replica signals 217(a-n) and sends a selected transmit replica signal 219a to a demodulator 228a and an adaptive filter 234a. However, other arrangements for coupling to the adjacent channels are possible, as would be apparent to skilled in the relevant art(s) given the present description. During normal operation of transceiver 108a, transmit replica signal 217a is selected by MUX 280a as the supplier of the selected transmit replica signal 219a. During channel to channel fault testing of an one of adjacent channels 106b-106n, MUX 280a would typically select a corresponding transmit replica signals 217b-217n from transceivers 108b-108n.

The following discussion applies generically to transceivers 108a-108n. Thus when the distinction between one of the transceivers and the others is not needed, the suffix letter (e.g., a-n) will be omitted. FIG. 2 may be used for reference although it represents a specific transceiver in order to show the interrelationship with other transceivers.

In an example transceiver 108, Line interface 204 couples receive signal 114R to receive path 206. Receive path 206 includes a variable gain amplifier 224, an analog-to-digital converter (ADC) 226, and a demodulator 228, connected in series. Amplifier 224 amplifies signal 222R, and provides an amplified receive signal 230 to ADC 226. ADC 226 samples signal 230 in accordance with an ADC sample clock 229, generated by sample clock generator 210, to produce a digitized receive signal 232.

ADC 226 provides signal 232 to demodulator 228. Demodulator 228 includes an adaptive filter 234 followed by a post-filtering stage 238. Demodulator 228 and adaptive filter 234 receive the selected transmit replica signal 219 from transmit path 202. In the exemplary arrangement of transceiver 108a depicted in FIG. 2, adaptive filter 234a is coupled to communication channel 106a through components 204a, 224a and 226a. However, other arrangements for coupling the adaptive filter to the communication channel are possible, as would be apparent to one skilled in the relevant art(s) given the present description.

In example transceiver 108, adaptive filter 234 generally represents any number of adaptive signal processors including, but not limited to, an echo canceller and an equalizer. In one example arrangement of the present invention, adaptive filter 234 includes an adaptive echo canceller that uses transmit replica signal 219 to subtract out echoes or cross talk included in receive signal 114R. In another arrangement, adaptive filter 234 includes an adaptive equalizer that equalizes receive signal 114R. Adaptive filter 234 may operate as an equalizer, a cross talk canceller, and/or an echo canceller, and may also provide adaptive filtering in addition to cancelling and equalization. Thus, adaptive filter 234 may include at least one of an adaptive echo canceller, cross talk canceller, and an adaptive equalizer.

Adaptive filter 234 processes signal 232, in accordance with a set of adaptive filter coefficients 236 produced by the filter, to produce a processed (e.g., adaptively filtered) receive signal 240. Adaptive filter coefficients 236 generally represent adaptive filter, adaptive echo canceller, adaptive cross talk canceller, and/or adaptive equalizer coefficients, whereby adaptive filter 234 adaptively filters, adaptively echo cancels, adaptively cross talk cancels, and/or adaptively equalizes signal 232, respectively. Post-filtering stage 238 further processes signal 240 to produce corrected, adaptively filtered output stream 118R. Post-filtering stage 238 also derives a feedback error signal 244, and provides the error signal to adaptive filter 234.

Controller module 208 controls transceiver 108. Controller module 208 includes controller logic 246, a memory 248 for storing a polynomial constant database, and a memory 250 for storing a threshold database. Controller logic 246 includes a channel diagnostic module 252 and a phase tuner and timing recovery module 254. The polynomial constant database stored in memory 248 includes a first set of polynomial constants 256 indicative of channel faults, a second set of polynomial constants 257 indicative of channel to channel faults, and a third set of polynomial constants 258 indicative of channel length. Likewise, the threshold database stored in memory 250 includes a first set of thresholds 260 indicative of channel faults, a second set of thresholds 261 indicative of channel to channel faults, and a third set of thresholds 262 indicative of channel length.

Controller logic 246 accesses the polynomial constant database stored in memory 248 and the threshold database stored in memory 250 as needed by channel diagnostic module 252 in order to execute methods of the present invention.

Controller logic 246 controls adaptive filter 234 through an interface 264. For example, controller 208 issues commands to filter 234, and accesses filter coefficients 236 through interface 264. Controller 208 stores filter coefficients in a controller memory 270.

Transceiver 108 includes a user interface 268 that supports user interaction with the transceiver through input/output (I/O) operations. For example, a user may program databases memories 248 and 250 through interface 268, and controller 208 may report test results to the user through the interface.

Controller 208 also controls sample clock generator 210 over an interface 270. For example, controller 208 issues sampling phase commands to generator 210 over interface 270. In turn, generator 210 generates sample clock 229 at sampling phases in accordance with the sampling phase commands. ADC 226 samples signal 230 in accordance with the sampling phases of clock 229 to produce sampled signal 232. Controller 208 also controls the gain of variable gain amplifier 224.

Figure 3:
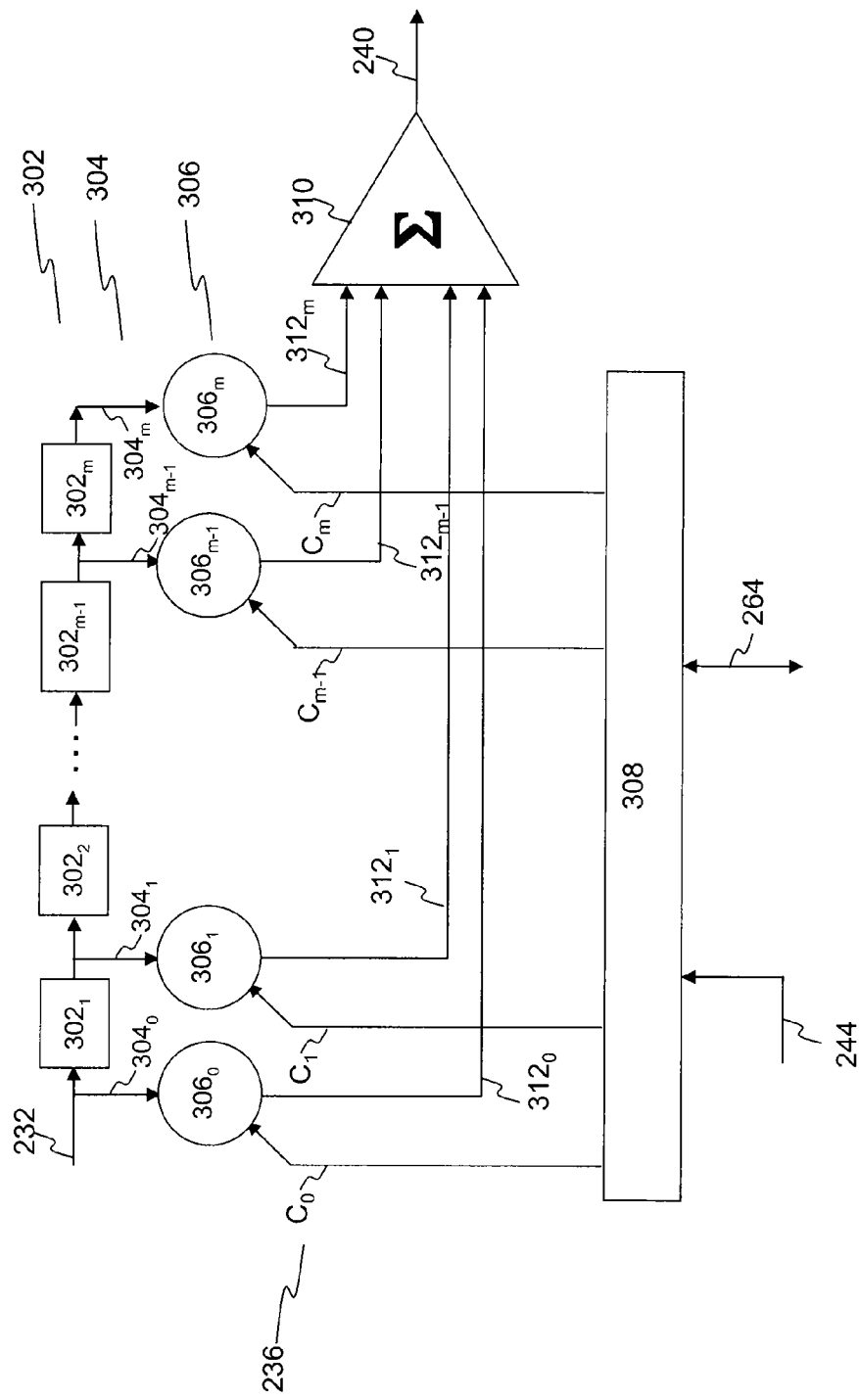
FIG. 3 is block diagram of an example arrangement of an adaptive filter of FIG. 2.

FIG. 3 is a block diagram of an example arrangement of an example adaptive filter 234. Adaptive filter 234 includes a series of time delay elements 302, a set of signal taps 304 coupled to delay elements 302, a set of multipliers 306 coupled to taps 304, an adaptive coefficient adjustment module 308, and a summer 310. Time delay elements $302_1$-$302_m$ successively delay digitized receive signal 232 and feed taps $304_1$ to $304_m$ (where subscripts 1-$m$ indicate tap numbers) with successively delayed representations or portions of signal 232. As depicted in FIG. 3, non-delayed signal 232 feeds tap $304_0$ directly, while successively delayed representations or portions of signal 232 produced by delay elements $302_1$-$302_m$ feed respective taps $304_1$-$304_m$. Each tap $304_0$-$304_m$ feeds a respective one of multipliers $306_0$-$306_m$. With the example tap numbering convention adopted in FIG. 3, an increase in tap number corresponds to an increase in time delay in filter 234.

Module 308 generates adaptive filter coefficients 236 (labeled in FIG. 3 as filter coefficients $C_0$-$C_m$) based on feedback error signal 244, and provides each of the coefficients to a respective one of multipliers $306_0$-$306_m$, as depicted in FIG. 3.

Multipliers $306_0$-$306_m$ produce product signals $312_0$-$312_m$ based on filter coefficients $C_0$-$C_m$ and the respective successively delayed signals associated with taps $304_0$-$304_m$. Summer 310 sums product signals $312_0$-$312_m$ to produce processed signal 240.

Figure 4A:
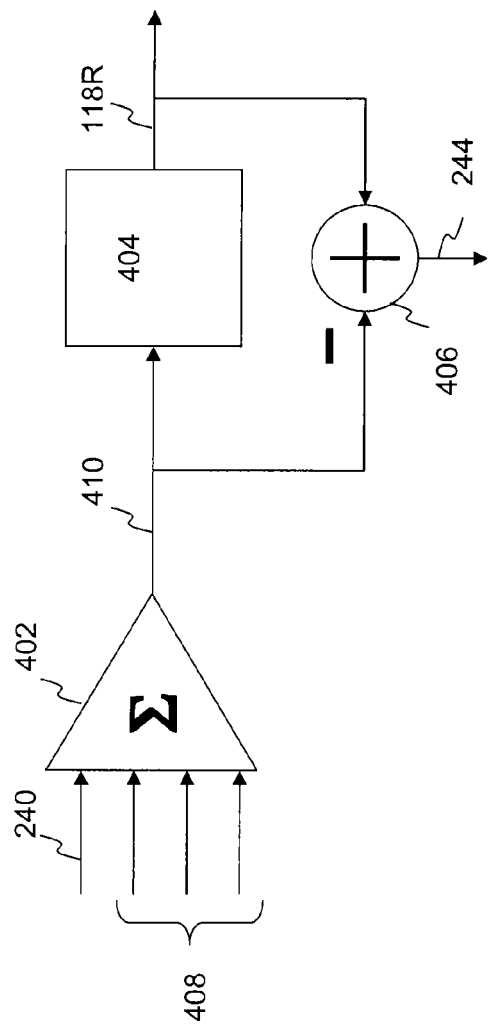
FIG. 4A is a block diagram of an example arrangement of a post filter stage of FIG. 2.

FIG. 4 is a block diagram of an example arrangement of post-filtering stage 238. In the depicted arrangement, a signal summer 402 sums processed signal 240 with signals 408 from other filters (not shown) to produce a "soft decision" signal 410. By "soft decision" it is meant that signal 410 may take on a range of different values, instead of just one of two logic values (for example, logic "1" and logic "0"). In an alternative arrangement, signals 408 are omitted. A slicer 404 processes soft decision signal 410 to produce corrected output stream 118R, including a stream of "hard decisions" (such as logic "1s" and logic "0s") made by slicer 404. A comparator 406 compares soft decision signal 410 to corrected output stream 118R to produce feedback error signal 244.

Presented below in connection with FIGS. 5A-6B are exemplary methods of determining information about a communication channel and adjacent channels using adaptive filters coupled to the channels, according to the present invention.

Echo Testing on a Single Channel

During normal operation, an adaptive filter (for example, filter 234) reverses the negative effects of a noisy and distorting transmission medium (such as channel 106a). The output of the filter (for example, signal 240 or signal 118R) is a best-guess estimate of the symbol stream the link partner's transmitter sends (for example, the symbol stream transmitted by the transmitter in remote transceiver 110a). The filter includes a series of multiply-and-add stages (for example, components 306 and 310) that operate on the received data stream (for example, signal 232). Each multiplier (for example, multiplier $306_i$) has an associated filter coefficient (for example, filter coefficient $C_i$) that adapts itself to the characteristics of the received data stream such that the filter reverses the noise and distortion effects of the channel.

U.S. application Ser. No. 10/282,206, entitled "CHANNEL DIAGNOSTIC SYSTEMS AND METHODS", by Sang T. Bui et al, filed Oct. 29, 2002, and incorporated herein by reference in its entirety, describes in detail methods for Echo Testing a channel.

In brief, those methods compare the filter coefficients to a predetermined set of filter coefficient fault thresholds. An abnormally large filter coefficient indicates a fault in the channel, and a good approximation of the distance between the transceiver and the channel fault can be calculated based on the tap number of the enlarged coefficient.

The filter coefficients exceed the above mentioned thresholds for the following reason. Channel faults (and similarly, the coupling between the end of the channel and the remote transceiver or link partner) cause an impedance mismatch in the channel. Thus, the fault (or channel-end coupling) returns substantial reflections of the transmitted signal 114aT, that originated at the transmit path 202, back to the adaptive filter 234. Adaptive filter 234 attempts to remove the effects of the reflections or echoes by enlarging some of the filter coefficients. The longer the distance between the transceiver 108a and the channel fault, the longer it takes for the reflection to return to the adaptive filter, and the larger the tap number(s) of the enlarged coefficients.

Another way of looking at this process is as follows. Under normal conditions, adaptive filter 234 receives a replica of the transmitted signal 114aT from its associated transmit path 202a, via transmit replica signal line 219. By storing delayed copies of transmit replica signal 217a in the filter delay elements, and adjusting the corresponding coefficient values, the adaptive filter adjusts to the "timing" of the transmitted signal in the channel. Such timing of the transmitted signal is inherently represented by the adapted filter coefficients. When no fault exists, channel length can be determined by similarly measuring the echo return from the end of the channel.

Thus, referring to FIG. 1A, fault 116 in channel 106a can be detected and ranged by these methods disclosed in the '206 application. However, FIG. 1B illustrates a condition which poses difficulties to those methods. Channel to channel fault 126 represents a fault which allows crosstalk: signal from channel transmission 114bT on 106b travels through fault 126 and onto channel 106a. Concurrently, transmission 114aT on channel 106a is being reflected from fault 126. Adaptive filter 234a in transceiver 108a may not converge and thus may not correctly detect the fault. In other cases, adaptive filter 234a in transceiver 108a might converge on the fault, but is unable to determine whether the fault is a single channel fault or a channel to channel fault.

Multi-Channel Testing for Channel to Channel and Single Channel Faults

A channel to channel fault (for example, fault 126 from channel 106a to 106b) which results in crosstalk can be detected by essentially transmitting with transceiver 108a on channel 106a and timing the arrival of the signal on 106b at transceiver 108b. In the invention, one or more adaptive filters are configured to perform this timing operation to detect and range channel to channel faults.

When configured to echo test a single channel as described above, adaptive filter 234 is coupled to the transmit replica signal 217 for that channel. Thus it can "time" how long it takes for an echo of the transmit signal to return on the receive line 222R. For example, in FIG. 1A an adaptive filter in transceiver 108a can "time" the transit of the echo from transmission, off of fault 116, and reception back at transceiver 108a.

Conversely, FIG. 1B demonstrates the principle of detecting a channel to channel fault 126. Transceiver 108a is transmitting while transceiver 108b is not. Transceiver 108b is also coupled to the transmit replica signal 217a (not shown) from transceiver 108a. Transceiver 108b can thus "time" how long it takes for cross talk to transit from transmission at the adjacent transceiver 108a, down the adjacent channel 106a, across channel to channel fault 126, and back through channel 106b to be received at transceiver 108b.

In one embodiment, adaptive filters are used to measure the transit time of the cross talk. Adaptive filters are coupled between the channels on which cross talk is being detected. Many arrangements are possible to couple the adjacent channel or channels. An exemplary embodiment discussed above and represented in FIG. 2 will be used to illustrate the general principle. In FIG. 2, transmit replica signal 217a is multiplexed with transmit replica signals 217b-217n from transceivers 108b-108n. MUX 280a selects the desired transmit replica signal from signals 217a-217n. Thus adaptive filter 234a and demodulator 228a are coupled to the selected channel via MUX 280a and selected transmit replica signal path 219a.

In one embodiment, communication channels are XT Tested. In another embodiment, the channels are XT Tested and Echo Tested. The XT Test and the Echo Test results may be correlated to identify and/or locate single channel faults, channel to channel faults, and multi-channel (encompassing three or more channels) faults. The following embodiments address performing both Echo and XT Testing, as this will typically yield the most useful diagnoses.

FIG. 5A is a flowchart representing an example method 500 of diagnosing one or more communication channels, such as channels 106a-106n depicted in FIGS. 1A-1B. Method 500 includes a first step 510 ("Echo Test a Channel"). In step 510, a first channel to be tested is Echo Tested for channel faults.

In a step 550 ("XT Test the channel with its adjacent channels"), the first channel is XT Tested for channel to channel faults to adjacent channels.

In an optional step 591 ("correlate the channel's XT and Echo Test results"), the results from the XT Test and the Echo Test for the channel just tested may be correlated to identify single channel and channel to channel faults.

Decision step 599 ("Test another channel") allows iteration through the channels to be tested. For example, if there is a second channel to be tested, flow is to step 510, and the testing process of above steps 510 to 591 are repeated. After the process has iterated through all of the desired channels, flow is to a step 590.

In a step 590 ("Correlate XT and Echo Test Results"), the results of the above tests are correlated to identify the single channel and the channel to channel faults. In one embodiment, the correlation also includes identifying multi-channel faults (e.g., where 3 or more channels are shorted together).

FIG. 5B contains a flowchart representing another testing example, method 501, of diagnosing communication channels. In method 501, all of the channels to be tested are echo tested first in a step 510, then the XT Tests are performed for all the channels to be tested in a step 550. A correlation step 590 is performed to identify single channel, channel to channel and multi-channel faults.

Methods 500 and 501 are just two examples of possible testing procedures. A tester may desire to XT Test first and then Echo Test, or echo test some channels separately from others, and so on.

Figure 5C:
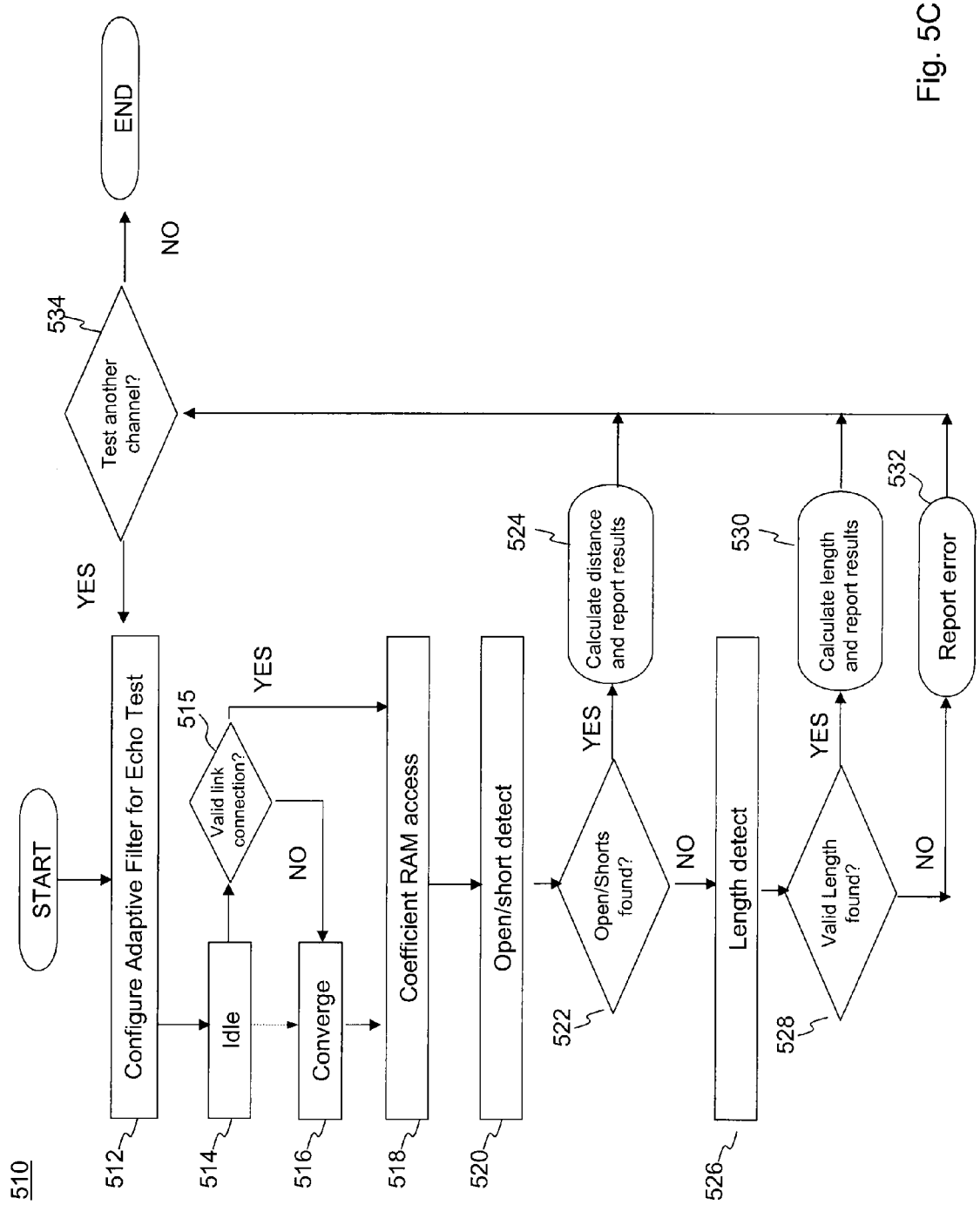
FIG. 5C is a flowchart of an example method of determining information about a channel; it is part of the example methods represented in FIGS. 5A-5B.

FIG. 5C is a flowchart of an example method 510 of Echo Testing a channel. As mentioned above, the '206 application incorporated herein describes in detail the methods for Echo Testing a channel. These methods are briefly described herein, and shown incorporated in a broader testing scheme.

In one embodiment, the channels to be tested are XT Tested and Echo Tested. An example of Echo Testing may consist of comparing a set of converged filter coefficients to a predetermined set of filter coefficient thresholds and determining information about the channel based on the comparison. Another embodiment of Echo Testing includes a more detailed process to establish the necessary configuration and converge the filter coefficients. The following example which is used to convey the principles echo testing includes these steps. However, one of skill in the art will readily recognize that certain steps in this example embodiment may be skipped because actual operating conditions may render certain steps of this example superfluous (e.g., there is no need to perform a step which configures the system if it is already in the desired configuration).

By way of example, Echo Testing method 510 is described in the context of transceiver 108a and an exemplary embodiment illustrated in FIGS. 2-4. In this example embodiment, method 510 may be implemented under control of controller 208a in transceiver 108a. Method 510 includes a first step 512 ("configure adaptive filter for echo test"). In step 512, MUX 280a selects transmit replica signal 217a, thus coupling adaptive filter 234a and demodulator 228a to transmit path 202a.

After step 512, the Echo Test may remain idle in step 514. In an example operational scenario, transceivers 108a and 110a attempt to establish a valid communication link between themselves, to enable communication over the valid link (and communication channel 106a). To do this, transceivers 108a and 110a traverse a communication link setup protocol. Typically, this includes exchanging initial hand-shaking signals and verifying a valid link has been established, as would be apparent to one skilled in the relevant art(s). When a valid link exists, filter coefficients $C_0$-$C_n$ (collectively referred to as filter coefficients C) have properly converged to settled coefficient values.

In practice, a valid link may not exist between link partner transceivers 108a and 110a. For example, there may be a fault in communication channel 106a or transceiver link partner 110a may not be connected to the communication channel. When a valid link does not exist, filter coefficients C can be in an indeterminate (non-converged) state, thus providing little or no useful information about channel 106a. Decision step 515 ("valid link connection?") checks for a valid link. If there is no valid link, flow is to a step 516. If there is a valid link, flow is to a step 518.

Method 510 overcomes or avoids indeterminate filter coefficients in step 516 ("converge"). In step 516, controller 208a instructs adaptive filter 234a, over interface 264a, to converge filter coefficients C. Adaptive filter 234a performs a convergence, and filter coefficients C adapt properly to characteristics of channel 106a. Step 516 includes initializing the filter coefficients C to initial values, and then permitting the initialized coefficients to settle to converged values based on the receive signal (e.g., signal 232a), for example, while adaptive filter 234a performs filtering, echo canceling, and/or equalization. After convergence, converged filter coefficients C indicate useful information about channel 106a.

Note that step 516 is an optional step. If a valid link exists, as checked in step 515, flow may proceed to step 518. Conversely, decision step 515 may be deleted, and the converge step 516 may be performed every time.

In a step 518 ("coefficient RAM Access"), controller 208a accesses converged filter coefficients C and stores them in memory 270a of the controller.

A step 520 ("open/short detect") is a comparison step that is part of testing channel 106a for open or short channel fault conditions that may be caused, for example, by a break in the channel. This step includes comparing filter coefficients C to thresholds 260a indicative of channel faults (also referred to as open/short thresholds 260a). In one embodiment, step 520 includes comparing an absolute value of each of the filter coefficients C to a corresponding one of the open/short thresholds 260a, sequentially beginning with the filter coefficient corresponding to the signal tap having the least amount of time delay (e.g., in the signal tap order $304_0$-$304_m$). Processing the filter coefficients in an order of increasing tap number (i.e., time delay) identifies channel faults nearest transceiver 108a.

A next step 522 ("open/short found?") is a decision step. If step 520 detected a filter coefficient among filter coefficients C that exceeded its corresponding one of the open/short thresholds 260a, then a channel fault (e.g., channel fault 116 in channel 106a) is identified, and step 522 returns a "YES" signal. Example Echo Test method 510 then proceeds to a step 524 ("calculate and report results"). If step 520 did not detect a coefficient representing the existence of a channel fault, then step 522 returns a "NO" signal and method 500 proceeds to a step 526 ("length detect").

A step 524 ("calculate distances and report results") includes calculating a distance to the channel fault detected in step 520 and reporting the results over user interface 268a. To determine the distance between transceiver 108a and channel fault 116, controller 208 determines the tap number (t) of the first one of the filter coefficients C that was found in step 508 to exceed its corresponding one of the open/short thresholds 260a. Controller 208a processes the tap number (t) in accordance with the following:

$A*t+B$=length where:

"*" represents the multiplier operator,

A and B are predetermined polynomial values in the first set of constants 256a indicative of channel faults, t is the tap number corresponding to the coefficient that exceeds its corresponding one of the open/short thresholds 260a, and length is the distance from the transceiver/adaptive filter to the channel fault (e.g. channel fault 116).

The length can be reported over user interface 268a. In addition, status flags may be set, such as status bits in a register associated with controller 208a, indicating the fault process has completed and that a channel fault was found.

If a fault was not detected, then flow proceeds from step 510 to step 514, as mentioned above. Step 514 is a comparison step, wherein filter coefficients C are compared to thresholds 262 indicative of channel length (also referred to as length thresholds 262).

Step 526 is similar to step 520, except that the thresholds used are length thresholds 262a. Also, filter coefficients C are compared to corresponding ones of length thresholds 262a in a reverse order with respect to the order of comparison of step 520. That is, the filter coefficients C are traversed sequentially beginning with the coefficient corresponding to the signal tap having the most amount of time delay (e.g., in the signal tap order $304_m$-$304_0$).

A next step 528 ("valid channel length?") is a decision step. If step 526 detected a filter coefficient among filter coefficients C that exceeded its corresponding one of the length thresholds 262, then step 528 returns a "YES" signal. Example Echo Test method 510 then proceeds to a step 530 ("calculate length and report results"). If step 526 did not detect a coefficient useful for calculating length, then step 528 returns a "NO" signal and example Echo Test method 510 proceeds to a step 532 ("report error").

In step 530, controller 208 determines the tap number (t) associated with the first coefficient that was found in step 514 to exceed its corresponding one of the length thresholds 262. Controller 208 processes the tap number (t) in accordance with the following:

$C*t+D$=length where:

C and D are predetermined polynomial values in the second set of constants 258 indicative of channel length, t is the tap number, and length is the channel length (e.g. the length of channel 106a). The length can be reported to or accessed by a user through user interface 268. In addition, status flags may be set, such as bits in a register associated with controller 208, indicating that length has been determined and that no channel fault was found.

Step 532 includes reporting an error to user interface 268 if no filter coefficient among filter coefficients C is found to exceed its corresponding one of the length thresholds 262. After channel information has been determined in steps 524, 530, or after an error has been reported in step 532, flow proceeds to a next step 534 ("next channel?"). Step 516 includes determining whether a further non-diagnosed channel is desired to be tested. After all the desired channels are analyzed, example Echo Test method is complete. In the example methods 500 and 501 (represented in FIGS. 5A and 5B, respectively), flow goes to step 550, XT Test, which corresponds to example method 550.

Figure 5D:
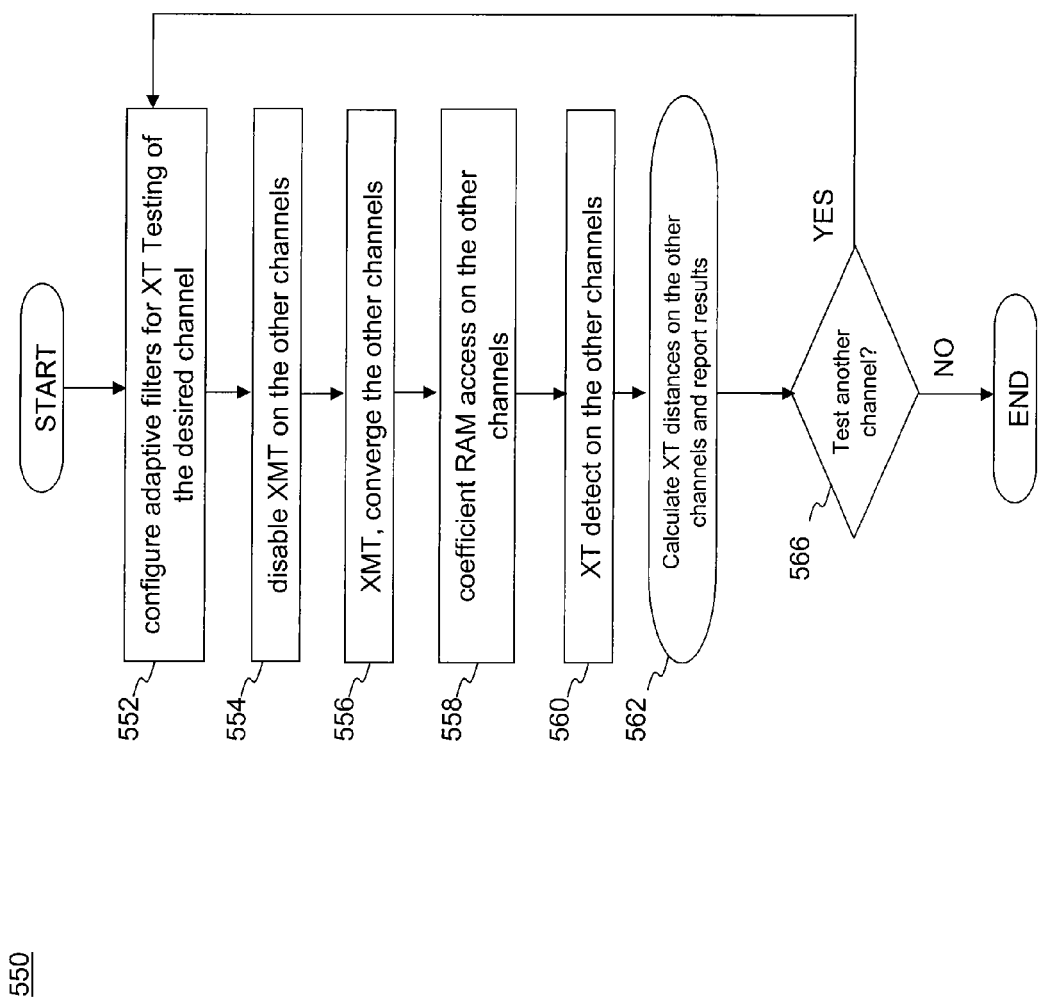
FIG. 5D is a flowchart of an example method of determining information about a channel and at least one other channel and it is part of the example methods represented in FIGS. 5A-5B.

Example method 550 for XT Testing is represented by the flowchart of FIG. 5D. Using an embodiment represented by FIG. 2, XT Testing of channels 106a through 106n, in a-n order, will be described to explain XT testing by way of example. For the sake of the example, we will assume that all channels a-n are adjacent to each other, and all channels are to be tested. Of course, this will double the amount of testing to be done, i.e. once channel x is tested with y, there is no need to test channel y with x. In an embodiment, the test procedure takes this into account, and only tests each pair of channels against one another once. In another embodiment, each channel is tested against all of the other channels, and the converse test results (e.g. x to y and y to x) are used to verify the integrity of the test. Of course, a tester may wish to only test selected channels; in an embodiment of the invention, the tester may select which channels to test.

Method 550 includes a first step 552 ("configure adaptive filters for XT Testing of the desired channel"). Since the test involves transmitting on one channel and "listening" on the others, all adjacent or otherwise desired channels will configure to "listen" for cross talk from the transmitting channel. In the current example, transceiver 108a is the first to transmit. It will transmit on channel 106a while channels 106b-106n "listen". As noted above, there are many possible arrangements for coupling an adaptive filter 234 between two adjacent channels 106 to perform XT Testing. For example, in place cross talk filters may be used to perform the XT Testing. In another embodiment, XT Test adaptive filters are in place or switched into the proper configuration. Here, the exemplary embodiment represented in FIG. 2 will be used to illustrate the general principles.

In each transceiver 108b-106n, each MUX 280b-208n selects the transmit replica signal 217a from transceiver 108a, thus coupling respective adaptive filters 234b-234n and demodulators 228b-228n to transmit path 202a in transceiver 108a.

Transmitting is disabled in the non-transmitting transceivers in a step 554 ("disable XMT on the other channels"). In the current example, channel 106a is being XT Tested. Thus, transceiver 108a will transmit while adjacent transceivers 108b-108n remain silent. In this step, transceivers 108b-108n can be directed to not transmit or be prevented from transmitting in any manner desirable.

In a step 556 ("XMT, converge the other channels"), the transceiver for the channel being tested begins transmitting, and the other channels converge their respective adaptive filters. In the current example, transceiver 108a begins transmitting. As in the Echo Test procedure, the converge process may not be necessary if adaptive filter coefficients have already converged. The converge process is similar to the converge process in the Echo Test: controllers 208b-208n instruct respective adaptive filters 234b-234n over interfaces 264b-264n to converge. Filter coefficients for adaptive filters 234b-234n are set to initial values, then are permitted to settle to converged values based on the respective signals received. After convergence, adaptive filters 234b-234n contain useful information about the integrity of their respective channel to channel isolation from channel 106a.

In a step 558, ("coefficient RAM access on the other channels"), controllers 208b-208n access converged filter coefficients C from corresponding adaptive filters 234b-234n and store them in their respective memories 270b-270n.

These converged filter coefficients are compared to the corresponding channel to channel thresholds 261a-261n indicative of channel to channel faults in a step 560 ("XT detect on the other channels"). In the current example, this step is a comparison step that is part of testing for any channel to channel faults from channel 106a to each individual adjacent channel 106b-106n.

In one embodiment, step 560 includes comparing an absolute value of each of the filter coefficients C for each respective adaptive filters 234b-234n to a corresponding channel to channel threshold 260b-260n, sequentially beginning with the filter coefficients (for each channel) corresponding to the signal tap having the least amount of time delay (e.g. in the signal tap order 304(0) to 304(m) as represented in FIG. 3). For each adjacent channel 106b-106n, this comparison searches for the first one of the coefficients C that is found to exceed its corresponding channel to channel threshold 261. Processing in this order of increasing tap number (i.e. time delay) first identifies channel to channel faults nearest to each respective transceiver 108b-108n.

In a step 562 ("calculate XT distances on the other channels and report results"), the distance to any channel to channel faults found in step 560 is determined. If step 560 found no faults, then no distance is calculated, and a no fault condition is returned. In the current example, for each channel 106b-106n in which a channel to channel fault was found, the respective controller (208b-208n) determines the tap number (t) of each fault. Controllers 208b-208n then processes the tap numbers in accordance with the following:

$$E*t+F=\text{length}$$

where:
"*" represents the multiplier operator,
E and F are predetermined polynomial values in the first set of constants 257 indicative of channel to channel faults corresponding to the respective controller 208b-208n,
t is the tap number corresponding to the coefficient that exceeds its corresponding one of the open/short thresholds 260b-260n, and
length is the distance from the corresponding transceiver/adaptive filter to the channel to channel fault (e.g. channel fault 126).

The length can be reported over user interfaces 268b-268n. In addition, status flags may be set, such as status bits in a register associated with controller 208b-208n, indicating the fault process has completed and that a channel fault was found.

After the channel information has been calculated and reported for each channel, a decision step 566 ("test another channel") is performed. If additional channels are to be tested, the step returns a YES. Otherwise, it returns a NO. In the current example, the example method 550 has tested channel 106a for channel to channel faults to the other channels 106b-106n. The tester may desire to stop testing, or a complete test for all possible channel to channel faults may be performed. In the current example, assume a complete test is to be performed. Flow is to step 552, and the next channel is tested. In an embodiment of a method testing all channels, the above process is repeated, sequentially substituting channels 106b-106n for channel 106a. For example, when channel 106c is tested, the adjacent channels would be 106a, 106b, and 106d-106n.

In another embodiment, once a channel has been tested, it will not be tested again as an adjacent channel. In other words, once channel 106a has been XT Tested against adjacent channel 106b, when channel 106b is XT Tested, channel 106a is left out of the list of adjacent channels (as the 106a to 106b boundary has been tested already). Thus, in the second pass through the process, channel 106b is XT tested, but only against the adjacent channels 106c-106n. After the process for channel 106b is complete, it is repeated for 106c, and 106b and 106a are left out of the testing. This is repeated until channel 106(n−1) is tested against channel 106(n).

FIGS. 5A and 5B show a correlation step 590. In correlation step 590, the simple open/short, single channel faults are distinguished from the channel to channel faults by comparing the respective lengths to the faults in each channel. An additional correlation step may be taken, in which channel to channel faults are compared across channels to identify multi-channel faults (e.g. where 3 or more channels are shorted together).

Figure 4B:
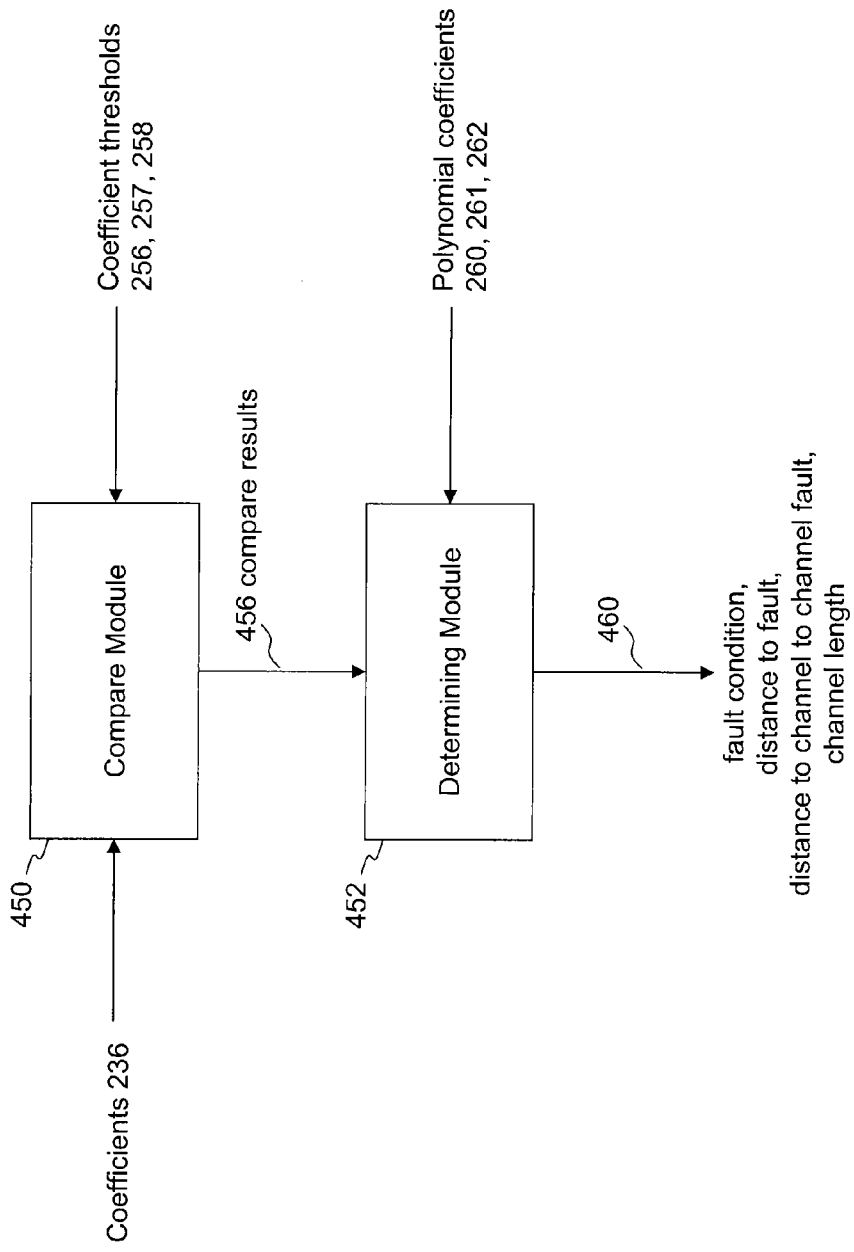
FIG. 4B is a block diagram of a diagnostic module in a controller of the transceiver of FIG. 2.

FIG. 4B is a block diagram of an example arrangement of diagnostic module 252 of controller 208. Module 252 includes a compare module 450 coupled to a determining module 452. Compare module 450 includes comparing logic (such as one or more comparators) for comparing filter coefficients C to corresponding members of the coefficient threshold sets 256, 257, and 258, in the manner described above. Compare module 450 produces compare results 456 based on these comparisons. Compare results 456 may include flags indicating which, if any, of the filter coefficients exceed their respective thresholds, for example.

As inputs, determining module 452 receives compare results 456, polynomial coefficients from databases 260, 261, and 262, and tap numbers corresponding to filter coefficients C. Based on these inputs, determining module 452 can determine whether a channel fault or a channel to channel fault exists, the distance to such a fault, or the channel length, in the manner described above. Determining module 452 produces these determinations as a results signal 460.

Fine Tuning the Received Signal Sampling Phase

Figure 6B:
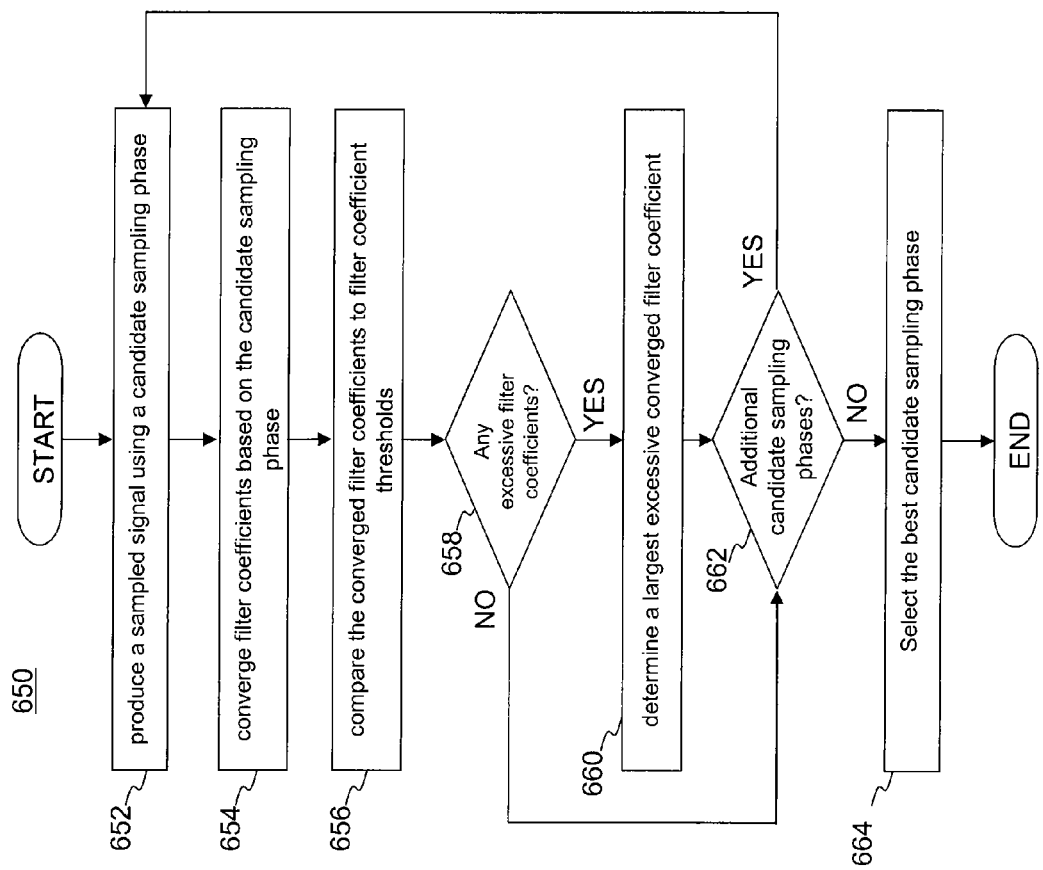
FIG. 6B is a flowchart of an example method of fine tuning a received signal sampling phase in a transceiver based on filter coefficients.
Figure 6A:
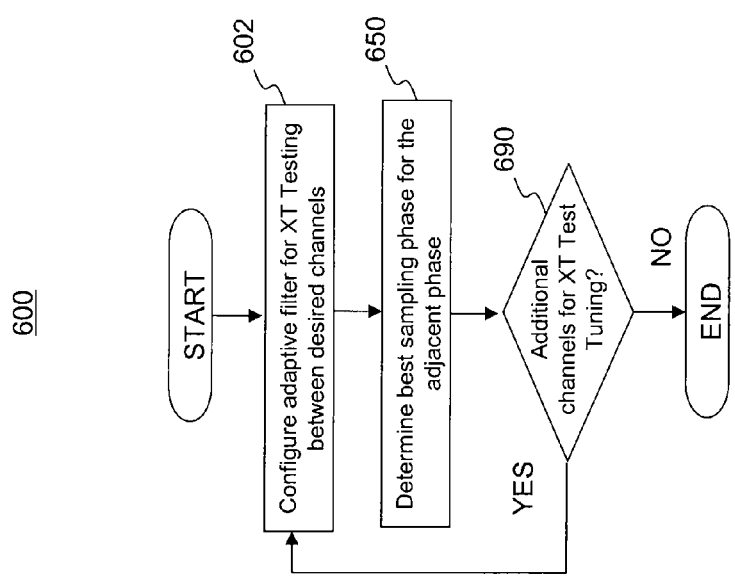
FIG. 6A is a flowchart of an example method of fine tuning received signal sampling phases in transceivers based on filter coefficients.

FIG. 6A is a flowchart of an example method 600 of fine-tuning a received signal sampling phase in at least one transceiver 108 coupled to the desired channel for XT Testing, using at least one set of filter coefficients and at least one predetermined set of filter coefficient thresholds corresponding to each set of filter coefficients. Method 600 may be implemented in at least one apparatus, such as a receiver (for example, receive path 206), or more generally, at least one transceiver 108, under the control of at least one controller module 254. Method 600 will be illustrated by way of example, using an exemplary embodiment of the invention illustrated in FIGS. 2-4. Method 600 is equally applicable to other embodiments of the invention. For the current example, XT Testing is taking place between channel 106a and adjacent channels 106b-106n. In one embodiment, method 600 is performed on the adjacent channels in parallel; that is, all adjacent channels are configured and fine tuned at once. In another embodiment, the channels are fine tuned sequentially. Method 600 illustrates a sequential example embodiment. A parallel embodiment of the invention is similar, except steps 602 and 650 are performed on all adjacent channels concurrently.

A step 602 ("configure adaptive filters for XT Testing desired channel") includes coupling adaptive filter 234 in an adjacent transceiver 108 to the desired channel for XT Testing. In the current example, the tester intends to determine the best sampling phase or phases for XT testing channel 106a with adjacent channels 106b-106n. In this example, in the first time through step 602, channel 106b is the channel being fine tuned, thus MUX 280b selects transmit replica signal 217a from transceiver 108a, coupling adaptive filter 234b and demodulator 228b to transmit path 202a in transceiver 108a. In the next iterations (if any) of step 602, channel 106c through channel 106n will be lined up in a corresponding fashion.

Method 600 includes a step 650 ("determine best sampling phase for the adjacent phase"). This step is described in detail elsewhere herein as it corresponds to method 650, an exemplary embodiment of which represented in FIG. 6B. In brief, step 650 encompasses a process of fine tuning the received sampling phase for an adjacent transceiver 108. In the current example, the best received signal sampling phases for transceiver 108b is determined during the current iteration of this step. In the next iterations (if any), the remaining best sampling phases for adjacent transceivers 108c-108n will similarly determined.

A decision step 690 provides iteration through the adjacent channels 106b-106n. As mentioned above, method 600 may be performed in parallel, which would obviate the need for this step as the adjacent channels 106b-106n would undergo the method concurrently.

FIG. 6B represents method 650, which represents an exemplary embodiment of the process of fine tuning a received sampling phase in an individual transceiver. Method 650 is equally applicable to a transceiver configured for Echo Testing or XT Testing, but the result will be applicable only to that particular configuration. For example, if channel 106d is configured for Echo Testing, performing method 650 on channel 106d will result in fine tuning a received sampling phase for Echo Testing channel 106d. Thus, in an example embodiment illustrated by FIGS. 2-4, MUX 280d is selected to transmit replica signal 271d, i.e. channel 106d is configured for Echo Testing.

However, a channel may be configured for XT Testing, and method 650 may be used to fine tune a received sampling phase for the adjacent transmitting channel (i.e. the transmitting channel being XT Tested). For example, if method 750 is being performed as part of a step 650 in method 600, it will result in fine tuning a received sampling phase in the adjacent channels for XT Testing of the desired channel. To continue the example used to illustrate method 600, where XT Testing of transmitting channel 106a is being performed with silent adjacent channels 106(b-n), if adjacent channel 106b is the current adjacent channel of interest, MUX 280b has selected transmit replica signal 271a; i.e. channel 106b is configured to XT Test channel 106a with channel 106a transmitting.

Thus, the entering configuration determines the applicability of the results of method 650. Therefore, method 650 is described generically, i.e. using an example transceiver 108.

Method 650 includes a first step 652 ("produce a sampled signal using a candidate sampling phase") for producing a sampled signal using a candidate sampling phase. For example, ADC 226 produces digitized signal 232 using a candidate sampling phase of sample clock 229.

A next step 654 ("converge filter coefficients based on the candidate sampling phase") includes converging a set of filter coefficients based on the candidate sampling phase. This may involve initializing the set of filter coefficients 236, then allowing the set of filter coefficients 236 to adapt to the sampled signal having the candidate sampling phase. For example, adaptive filter 234 converges filter coefficients C based on receive signal 232, in response to a converge command from controller 208.

A next step 656 ("compare the converged filter coefficients to filter coefficient thresholds") includes comparing each filter coefficient in the set of converged filter coefficients 236 to a corresponding filter coefficient threshold in the set of filter coefficient thresholds (e.g., thresholds 260), in a manner as discussed above, for example, as in methods 510 and 550.

A next step 658 ("any excessive filter coefficients?") is a decision step. Step 658 includes determining if any of converged filter coefficients 236 exceed their corresponding coefficient thresholds (e.g., thresholds 260), as indicated at step 656. Together, steps 656 and 658 comprise determining if any of converged filter coefficients 236 are excessive, that is, if they exceed their corresponding thresholds (e.g., thresholds 260, 261, or 262). Controller 208 performs steps 656 and 658. If there are any excessive converged filter coefficients, then flow proceeds to a next step 660. Otherwise, flow proceeds to a next step 662.

Step 660 ("determine a largest excessive converged filter coefficient") includes determining a largest excessive converged filter coefficient among the excessive converged filter coefficients 236 determined at steps 656 and 658. For example, controller 208 determines a largest one of the excessive converged filter coefficients. This largest excessive coefficient corresponds to the candidate sampling phase used in step 652 to produce signal 232. Steps 652-660 alone are considered an independent method of processing a received signal in a receiver.

A next step 662 ("additional candidate sampling phases?") is a decision step. If there is an additional candidate sampling phase to be tested, step 662 returns a "YES" signal and flow returns to step 652. If all candidate sampling phases have been tested, then step 662 returns a "NO" signal and flow continues to a step 664.

Repetition of steps 652-662 produces one or more largest excessive converged filter coefficients corresponding to one or more respective candidate sampling phases, assuming step 662 returns at least one "YES" signal. Step 664 ("select the best candidate sampling phase") includes selecting as the best sampling phase the candidate sampling phase corresponding to a largest one of the largest excessive converged filter coefficients.

In method 650, steps 652-660 taken alone may be considered an independent method of processing a received signal in a receiver. The further steps 662-664, and the repetition of steps 652-660 for different candidate sampling phases, are necessary to select a best sampling phase among a plurality of candidate sampling phases.

Thus, in this example, method 650 selects a best sampling phase that maximizes the adaptive filter coefficients for the current configuration of a transceiver 108. Once method 650 selects the best sampling phase, transceiver 108 executes the channel diagnostic methods (i.e. Echo Testing or XT Testing) described above using the best sampling phase. Method 800 and methods for XT and Echo Testing may be used alternately to continuously fine tune the sampling phase used in transceiver 108 and in channel diagnostic methods 500-550.

Figure 4C:
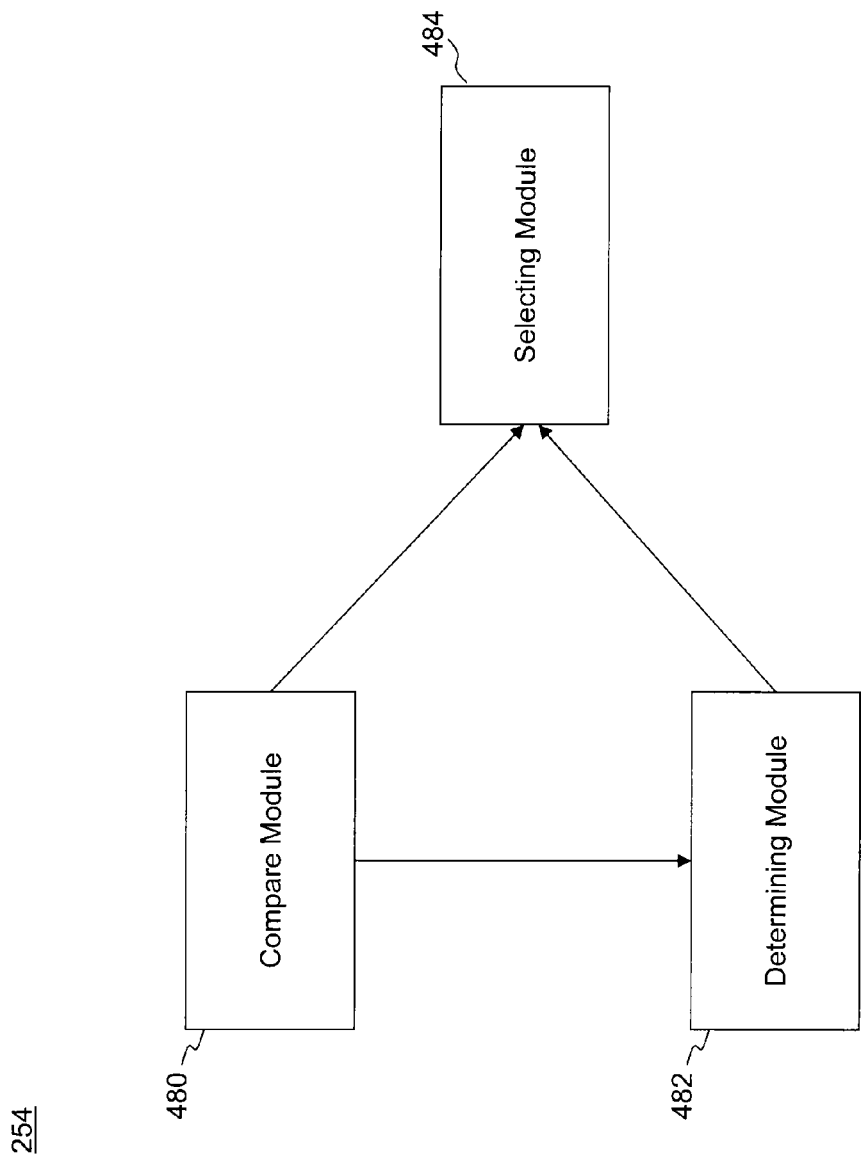
FIG. 4C is a block diagram of an example arrangement of a controller module in a controller of the transceiver of FIG. 2.

FIG. 4C is a block diagram of an example arrangement of controller module 254, used to implement portions of methods 600. Module 254 includes a compare module 480 for performing compare step 656 of method 600. Compare module 480 may include portions of compare module 450 discussed in connection with FIG. 4B. Module 254 further includes a determining module 482 for performing steps 658 and 660. Module 254 also includes a select module 484 for performing step 664.

Threshold

Methods 500-550 use three main sets of filter coefficient thresholds stored in memory 250 to compare against the absolute values of the filter coefficients C. The first set of thresholds 260 indicative of channel faults (i.e., open/short thresholds 260) is used to determine the existence of and distance to a channel fault; the second set of thresholds 261 indicative of channel to channel faults (i.e. XT thresholds 261) is used determine the existence of and distance to a channel to channel fault; and the third set of thresholds 262 indicative of channel length (i.e., length thresholds 262) is used to determine a channel length when no channel fault has been detected.

Due to the nature of adaptive filter coefficients C, poor results may be obtained if all of the filter coefficients C are compared to a single threshold. This is due to the fact that filter coefficients C corresponding to larger tap numbers (and thus, larger time delay) tend to have smaller absolute values after they are properly converged. Thus, a set of thresholds including thresholds of different values is used in the present invention. For example, a staircase approach is used in the present invention for the open/short thresholds 260, the XT thresholds 261, and length thresholds 262. Filter coefficients C are divided into three or four groups, and each group has its own corresponding fixed threshold for open short thresholds 260 and length thresholds 262, each being somewhat smaller than the threshold for the previous group. Thus, the different threshold values follow a staircase of values.

Polynomials

In addition to the open/short thresholds 260, the XT thresholds 261, and the length thresholds 262 mentioned above, there are several other variables that can be fine-tuned by the user. These are the constants within the polynomial constant database stored in memory 248. For the channel fault distance calculation $A*t+B=length$, the variable A is called the Open/Short Polynomial (Py) Linear term, and B is called the Open/Short Polynomial Constant term, and A and B are contained in the set of constants 256 applicable to channel faults.

In the channel to channel fault distance calculation $E*t+F=length$, the variable E is the XT Polynomial (Py) Linear term, and F is the XT Polynomial Constant term, and E and F are contained in the set of constants 257 applicable to channel to channel faults.

In the channel length calculation $C*t+D=length$, the variable C (not to be confused with filter coefficients C) is called the Channel Length Polynomial Linear term, and D is called the Channel Length Polynomial Constant term, and C and D are contained in the second set of constants 258 applicable to channel length.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks and modules can be implemented by discrete components including digital and/or analog circuits, application specific integrated circuits, processors executing appropriate software, hardware, firmware and the like or any combination thereof. Thus, the breadth and scope of the present invention should not be limited by any of the above-described exemplary embodiments, but should be defined only in accordance with the following claims and their equivalents.

What is claimed is:

1. A method of determining information about a first communications channel and at least one other communication channel, using at least one adaptive filter coupled to the first channel, the at least one adaptive filter including a set of adaptive filter coefficients, comprising:
    (a) comparing the set of filter coefficients to a predetermined set of filter coefficient thresholds; and
    (b) determining whether a channel to channel fault exists between the first channel and the at least one other channel based on the comparison in step (a), the channel to channel fault being a physical discontinuity between the first channel and the at least one other channel.

2. The method of claim 1, wherein a transmit replica signal from the first channel is input to the at least one adaptive filter and is multiplexed with at least one transmit replica signal from the at least one other communication channel.

3. The method of claim 1, wherein the at least one adaptive filter is coupled to the first channel and the at least one other channel.

4. The method of claim 1, wherein if it is determined in step (b) that a channel to channel fault exists, then step (b) further comprises:
    (b)(i) determining the location of the channel to channel fault.

5. The method of claim 4, wherein:
    step (b) comprises determining a filter coefficient indicative of the channel to channel fault among the set of filter coefficients based on said comparing in step (a); and step (b)(i) comprises determining the distance to the channel to channel fault based on a filter time delay corresponding to the filter coefficient indicative of the channel fault.

6. The method of claim 1, wherein step (a) comprises comparing filter coefficients in the set of filter coefficients to corresponding thresholds in the set of thresholds in an order of increasing filter time delay associated with each of the filter coefficients.

7. The method of claim 1, wherein step (a) comprises comparing filter coefficients in the set of filter coefficients to corresponding thresholds in the set of thresholds in an order of decreasing filter time delay associated with each of the filter coefficients.

8. The method of claim 1, wherein the predetermined set of thresholds includes thresholds indicative of a channel length.

9. The method of claim 1, wherein the predetermined set of thresholds includes thresholds indicative of a channel to channel fault.

10. The method of claim 1, further comprising, prior to step (a):
converging the set of filter coefficients.

11. The method of claim 1, wherein the predetermined set of filter coefficient thresholds include different thresholds.

12. The method of claim 11, wherein the predetermined set of filter coefficient thresholds include different thresholds that follow a staircase of values.

13. A method of determining whether a channel to channel fault exists between a communication channel an at least one other communication channel using an adaptive filter coupled to the first channel, the adaptive filter including a set of adaptive filter coefficients, comprising:
determining whether the channel to channel fault exists based on the adaptive filter coefficients and a set of filter coefficient thresholds, the channel to channel fault being a physical discontinuity between the communication channel and the at least one other communication channel.

14. The method of claim 13, wherein the set of filter coefficients is indicative of the presence of channel to channel faults, and said determining step includes determining whether a channel to channel fault exists.

15. A method of determining information about a first communication channel and at least one other communication channel using at least one adaptive filter coupled to each of the communication channels, the at least one adaptive filter having a set of adaptive filter coefficients, comprising:
(a) determining information about the first channel, comprising:
(i) comparing the set of filter coefficients of an adaptive filter coupled to the first channel to a predetermined set of filter coefficient thresholds,
(ii) determining information about the first channel based on the comparison in step (a)(i); and
(b) determining information about the first channel and the at least one other communication channel, comprising:
(i) for each of the at least one other channel, comparing the set of filter coefficients of the at least one adaptive filter to a predetermined set of coefficient filter coefficient thresholds, wherein the at least one adaptive filter is coupled to the first channel and to the other channel, and
(ii) determining whether a channel to channel fault exists between the first channel and the at least one other channel based on the comparison in step (b)(i), the channel to channel fault being a physical discontinuity between the first channel and the at least one other channel.

16. The method of claim 15, wherein step (a)(ii) further comprises:
determining if a channel fault exists in the first channel.

17. The method of claim 16, wherein if it is determined in step (a)(ii) that a channel fault exists, step (a)(ii) further comprises:
determining the distance to the channel fault.

18. The method of claim 15, wherein if it is determined that a channel fault exists in step (b)(ii), step (b)(ii) further comprises:
determining the location of the channel to channel fault.

19. A system for determining information about a communication channel and at least one other communication channel, comprising:
at least one adaptive filter coupled to the first channel and having a set of adaptive filter coefficients;
a memory for storing a predetermined set of filter coefficient thresholds; and
a controller including:
a compare module configured to compare the set of filter coefficients to the predetermined set of filter coefficient thresholds, and
a determining module configured to determine if a Channel to channel fault exists based on compare results from the compare module, the channel to channel fault being a physical discontinuity between the communication channel and the at least one other communication channel.

20. The system of claim 19, wherein if the controller determining module determines that a channel to channel fault exists, the controller determining module is configured to determine the location of the channel to channel fault.

21. The system of claim 20, wherein the controller determining module is further configured to:
determine a filter coefficient indicative of the channel to channel fault among the set of filter coefficients based on the compare results; and
determine the location of the channel to channel fault based on a filter time delay corresponding to the filter coefficient indicative of the channel to Channel fault.

22. The system of claim 19, wherein the controller compare module is configured to compare filter coefficients in the set of filter coefficients to corresponding thresholds in the set of thresholds in an order of increasing filter time delay associated with each of the filter coefficients.

23. The system of claim 19, wherein the controller compare module is configured to compare filter coefficients in the set of filter coefficients to corresponding thresholds in the set of thresholds in an order of decreasing filter time delay associated with each of the filter coefficients.

24. The system of claim 19, wherein the predetermined set of thresholds includes thresholds indicative of a channel length.

25. The system of claim 19, wherein the predetermined set of thresholds includes thresholds indicative of a channel to channel fault.

26. The system of claim 19, wherein the controller further comprises control logic configured to cause the adaptive filter to converge the set of filter coefficients prior to the controller compare and determining modules performing their respective functions.

27. The system of claim 19, wherein the controller farther comprises control logic configured to perform the following functions prior to the controller compare and determining modules performing their respective functions:
determine if a valid communication link exists between the adaptive filter and a communication link partner coupled to a portion of the communication channel remote from the equalizer; and
bypass a filter convergence operation that converges the set of filter coefficients if a valid communication link does exist.

28. The system of claim 19, wherein the adaptive filter includes at least one of an adaptive echo canceller and an adaptive equalizer.

29. The system of claim 19, wherein the controller determining module is further configured to determine if a channel fault exists based on the compare results.

30. The system of claim 29, wherein if the controller determining module determines that a channel fault exists, the controller determining module is configured to determine the location of the channel fault.

31. The system of claim 30, wherein the controller determining module is farther configured to:
determine a filter coefficient indicative of the channel fault among the set of filter coefficients based on the compare results; and
determine the location of the channel fault based on a filter time delay corresponding to the filter coefficient indicative of the channel fault.

* * * * *

UNITED STATES PATENT AND TRADEMARK OFFICE
CERTIFICATE OF CORRECTION

PATENT NO. : 8,331,430 B2
APPLICATION NO. : 11/461966
DATED : December 11, 2012
INVENTOR(S) : Wang et al.

It is certified that error appears in the above-identified patent and that said Letters Patent is hereby corrected as shown below:

Column 17, Line 30, "an at least" should be replaced with --and at least--.

Column 18, Line 28, "Channel to channel" should be replaced with --channel to channel--.

Column 18, Line 44, "Channel fault" should be replaced with --channel fault--.

Column 18, Line 66, "farther" should be replaced with --further--.

Signed and Sealed this
Twenty-sixth Day of February, 2013

Teresa Stanek Rea
*Acting Director of the United States Patent and Trademark Office*